United States Patent
Sasaki et al.

(10) Patent No.: US 8,252,357 B2
(45) Date of Patent: Aug. 28, 2012

(54) CUP SHAPED BAKED CONFECTIONARY AND MANUFACTURING METHOD THEREOF

(75) Inventors: Katsuma Sasaki, Saitama (JP); Yoko Usami, Chiba (JP); Masanori Ito, Saitama (JP)

(73) Assignee: Lotte Co., Ltd.

( * ) Notice: Subject to any disclaimer, the term of this patent is extended or adjusted under 35 U.S.C. 154(b) by 0 days.

(21) Appl. No.: 12/457,077

(22) Filed: Jun. 1, 2009

(65) Prior Publication Data

US 2009/0274801 A1    Nov. 5, 2009

Related U.S. Application Data

(62) Division of application No. 10/437,225, filed on May 14, 2003, now abandoned.

(30) Foreign Application Priority Data

May 27, 2002    (JP) .................................. 2002-152287

(51) Int. Cl.
*A21D 8/06*    (2006.01)
(52) U.S. Cl. ........ 426/549; 426/499; 426/502; 426/514; 426/523
(58) Field of Classification Search .................. 426/496, 426/502, 505, 512, 514, 523, 660, 499, 549
See application file for complete search history.

(56) References Cited

U.S. PATENT DOCUMENTS

| | | | |
|---|---|---|---|
| D25,318 S | 3/1896 | Perky | |
| D63,075 S | 10/1923 | Franco | |
| D66,672 S | 2/1925 | Dresser | |
| 1,794,238 A | 2/1931 | McKibben | |
| D90,954 S | 10/1933 | Peterson | |
| 2,156,145 A | 4/1939 | Cavett et al. | |
| D156,985 S | 1/1950 | Moffett, Jr. | |
| D171,122 S | 12/1953 | Conlin | |
| 2,691,337 A * | 10/1954 | Forrest | 425/470 |
| D203,657 S | 2/1966 | Benson | |
| 3,410,691 A * | 11/1968 | Stanley | 426/94 |
| D213,946 S | 4/1969 | Cooper | |
| D234,275 S | 2/1975 | Kosecoff | |
| 4,065,581 A * | 12/1977 | Heiderpriem | 426/138 |
| D251,816 S | 5/1979 | Majeski | |

(Continued)

FOREIGN PATENT DOCUMENTS

JP    2001-25351 A    *    1/2001

(Continued)

OTHER PUBLICATIONS

Machine translation of JP 2001-25351A.*

(Continued)

*Primary Examiner* — Drew E Becker
(74) *Attorney, Agent, or Firm* — Rader, Fishman & Grauer PLLC; Christopher M. Tobin

(57) ABSTRACT

A cup shaped baked confectionary has light texture, uniform thickness and easy to release from the die. The cup shaped baked confectionary may be produced by mounting a dough of a cup shaped baked confectionary having desired contour shape on a top of a metallic three-dimensional baking die having desired shape of outer peripheral surface, in a condition extending horizontally with placing outer periphery thereof outside of the three dimensional baking die and heating the dough for softening the dough of the cup shaped baked confectionary to contact on the outer peripheral surface of the three-dimensional baking die and baking.

4 Claims, 9 Drawing Sheets

U.S. PATENT DOCUMENTS

| | | | | |
|---|---|---|---|---|
| 4,535,688 | A | * | 8/1985 | Bentson .......................... 99/353 |
| 4,579,745 | A | | 4/1986 | Mei Sue |
| 4,656,935 | A | * | 4/1987 | Kukura .......................... 99/426 |
| 4,725,444 | A | | 2/1988 | Wilkins |
| 4,812,323 | A | * | 3/1989 | Savage ......................... 426/496 |
| D307,661 | S | | 5/1990 | Tetzlaff |
| 4,931,301 | A | | 6/1990 | Giuseppe |
| D312,914 | S | | 12/1990 | Daldrup |
| D325,112 | S | | 4/1992 | Thompson |
| 5,499,914 | A | * | 3/1996 | Rist ............................... 425/470 |
| D392,786 | S | | 3/1998 | Kieser |
| 5,795,613 | A | * | 8/1998 | Scharfmann et al. ......... 426/582 |

FOREIGN PATENT DOCUMENTS

JP    2001-025351 A1    1/2001

OTHER PUBLICATIONS

JPO Office Action with translation, App. No. 2002-152287, Aug. 5, 2005 (3 pages).

* cited by examiner

CUP SHAPED BAKED CONFECTIONARY AND MANUFACTURING METHOD THEREOF

CROSS REFERENCE TO RELATED APPLICATION

The present application is a Divisional Application of the patent application Ser. No. 10/437,225, filed on May 14, 2003 now abandoned, which is based on Japanese Priority Document JP2002-152287, filed in the Japanese Patent Office on May 27, 2002, the entire contents of which are incorporated herein by reference.

CROSS REFERENCE TO THE RELATED APPLICATION

The present application has been filed with claiming priority based on Japanese Patent Application No. 2002-152287, filed on May 27, 2002. Disclosure of the above-identified Japanese Patent Application is herein incorporated by reference.

BACKGROUND OF THE INVENTION

1. Field of the Invention

The present invention relates to a cup shaped baked confectionary and a manufacturing method thereof.

2. Description of the Related Art

Conventionally, as methods of manufacturing cup shaped baked confectionaries, such as tarts or the like by baking a material or dough of the cup shaped baked confectionary prepared by blending necessary raw materials, (1) a method as shown in FIG. 12 by baking a dough 3 of the cup shaped baked confectionary in a condition sandwiched between baking plates of a combined die consisted of a concave type baking plate 1 and a convex type baking plate 2, and subsequently peel the baked cup shaped baked confectionary 4 off the baking plates 1 and 2, (2) a method as shown in FIG. 13 by pressing and shaping a dough 6 of the cup shaped baked confectionary fitted on a concave type baking plate 5 by means of a convex die, baking the dough 6 of the cup shaped baked confectionary after removing the convex die, and then peeling a cup shaped baked confectionary 8 off the concave type baking plate, (3) a method as shown in FIG. 14 by extending the dough 11 of the cup shaped baked confectionary for covering a baking die 10 formed from a convex type curved plate form metal wire netting 9, shaping the dough 11 along the shape of the baking die 10 and baking in an oven together with the baking die 10, and so on have been known as disclosed in Japanese Unexamined Patent Publication No. 2001-25351.

However, in the method of (1), since the dough 3 of the cup shaped baked confectionary is baked in a condition compressed between the concave baking plate 1 and the convex baking plate 2, heat conductivity is low. Also, since expansion of the dough 3 is restricted, its structure becomes a high density to provide hard texture. Furthermore, releasing of the die becomes difficult.

In the method of (2), the dough 6 of the cup shaped baked confectionary can slack during baking to cause a difference between a central portion 12 of the cup and the edge portion 13 of the peripheral wall to cause difficulty in forming the cup shaped baked confectionary with uniform thickness. Furthermore, releasing of the die becomes difficult.

In the method of (3), the baked cup shaped confectionary can penetrate into the mesh of the metal wire netting 9 to cause difficulty to release from the die. Namely, all of these methods (1) to (3), difficulty is caused in releasing of the cup shaped baked confectionary after baking. Therefore, in order to prevent the baked confectionary from cracking or breakage upon releasing from the die, a thickness of dough inherently becomes thick. Therefore, it has been difficult to manufacture thin and small cup shaped baked confectionary, and efficiency in production of the cup shaped baked confectionary is inherently low.

SUMMARY OF THE INVENTION

The present invention has been worked out in view of the defects in the prior art. It is therefore an object of the present invention to obtain a cup shaped baked confectionary which has a light texture, uniform thickness and easy to release from the die.

A producing method of a cup shaped baked confectionary, according to the present invention, comprises the steps of:

mounting a dough of a cup shaped baked confectionary having desired contour shape on a top of a metallic three-dimensional baking die having a desired shape of an outer peripheral surface, in a condition extending horizontally with placing the outer periphery thereof outside of the three dimensional baking die;

heating the dough for softening the dough of the cup shaped baked confectionary to contact on the outer peripheral surface of the three-dimensional baking die and baking.

Preferably, the outer peripheral surface of the three-dimensional baking die may be formed into hemi-sphere shape, semi-elliptic ball shape, campanulate shape, semi-elliptic ball shape having leaf shaped bottom surface, semi-cylindrical shape or rectangular parallelepiped shape. Also, it is preferred that the three-dimensional baking die is formed with a flat portion at the top thereof.

A sheet dough may be prepared by rolling a dough mass containing 5 to 15 Wt % of protein, 15 to 28 Wt % of fat and 60 to 78 Wt % of sugar, preferably 5 to 10 Wt % of protein, 18 to 26 Wt % of fat and 63 to 75 Wt % of sugar in solid component, and is formed into desired shape by punching.

If protein content is less than 5 Wt %, bonding in the dough becomes low. On the other hand, if protein content is in excess of 15 Wt %, the dough becomes dry and crumbles. In either case, difficulty is encountered in forming into sheet form.

If fat content is less than 15 Wt %, bonding in the dough becomes low. On the other hand, if fat content is in excess of 28 Wt %, the dough becomes clammy to have small elasticity. In either case, difficulty is encountered in forming into sheet form.

When sugar content is less than 60 Wt %, the contents of protein and fat become relatively large to cause difficulty in forming into sheet form. On the other hand, if sugar content exceeds 78 Wt %, dough loses bond or becomes clammy to lower releasing ability from the baking die.

On the other hand, the thickness of the dough of the cup shaped baked confectionary is preferably in a range of 1 to 6 mm.

If the thickness of the dough becomes less than 1 mm, dough of the cup shaped baked confectionary is easily cause rupture. Also, after baking the cup shaped baked confectionary, it is easily broken upon releasing from the three-dimensional baking die.

On the other hand, if the thickness of the dough exceeds 6 mm, the dough of the cup shaped baked confectionary can slack excessively during baking, or can slack irregularly to cause difficulty in baking the cup shaped baked confectionary with good appearance.

The cup shaped baked confectionary according to the present invention has substantially uniform thickness entirely.

The cup shaped baked confectionary may contain 5 to 15 Wt % of protein, 15 to 28 Wt % of fat and 60 to 78 Wt % of sugar, preferably 5 to 10 Wt % of protein, 18 to 26 Wt % of fat and 63 to 75 Wt % of sugar in solid component.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIGS. 12(a) to 12(c) are sections showing the conventional production method of the baked confectionary, in which FIG. 12(a) shows a condition where the dough of the cup shaped baked confectionary is mounted on a concave baking plate, FIG. 12(b) shows a condition where the dough of the cup shaped baked confectionary is sandwiched between the concave shaped baking plate and the convex shaped baking plate, and FIG. 12(c) shows a condition where the convex shaped baking plate is lifted up after baking;

FIGS. 13(a) to 13(d) are sections showing another conventional production method of the cup shaped baked confectionary, in which FIG. 13(a) shows a condition where the dough of the cup shaped baked confectionary is mounted on the concave baking plate, FIG. 13(b) shows a condition where the dough is pressed and shaped by a convex shaped baking plate, FIG. 13(c) shows a condition where the dough of the cup shaped baked confectionary is baked with removing the convex shaped baking plate, and FIG. 13(d) shows the baked cut shaped baked confectionary.

DESCRIPTION OF THE PREFERRED EMBODIMENT

The present invention will be discussed hereinafter in detail in terms of the preferred embodiment of a cup shaped baked confectionary and manufacturing method thereof according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 1:
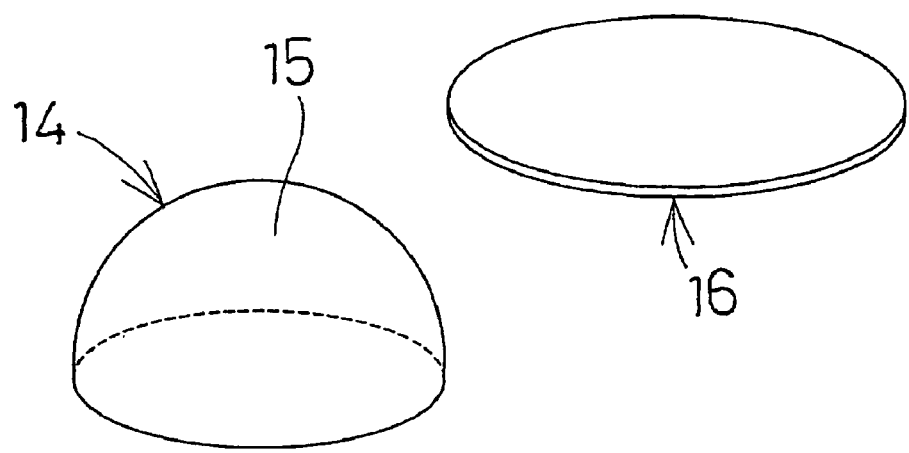
FIG. 1 is a perspective view of a three-dimensional baking die having hemi-spherical outer peripheral surface and a dough of a cup shaped baked confectionary.

A manufacturing method of cup shaped baked confectionary according to the present invention is performed in the following manner with a metallic three-dimensional baking die 14 having necessary shape of the outer peripheral surface 15, such as hemi-spherical shape and so forth, and a dough prepared by mixing and stirring necessary materials, rolled into a sheet dough by a rolling sheeter or the like and then punched or cut into a dough 16 for the cup shaped baked confectionary with a desired contour, such as circular shape or the like (FIG. 1).

Figure 2:
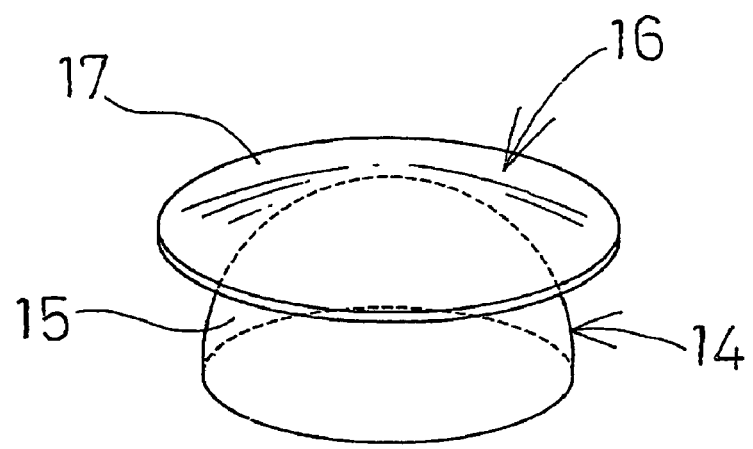
FIG. 2 is a perspective view showing a condition where the dough of the cup shaped baked confectionary is mounted on the three-dimensional baking die.

At first, the dough 16 of the cup shaped baked confectionary is mounted horizontally on a top of the three-dimensional baking die 14 without shaping it along the outer peripheral surface 15 of the three-dimensional baking die 14 (FIG. 2). Then, the dough 16 of the cup shaped baked confectionary is placed within an oven together with the three-dimensional baking die 14 for baking for a necessary period.

Figure 3:
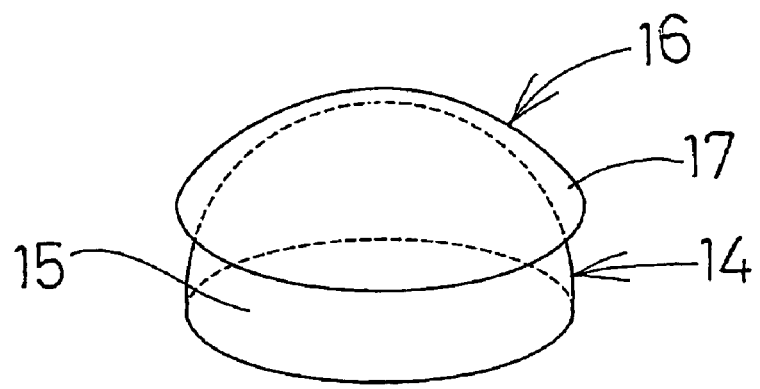
FIG. 3 is a perspective view showing a condition where the outer periphery of the dough of the cup shaped baked confectionary slacks during baking.
Figure 4:
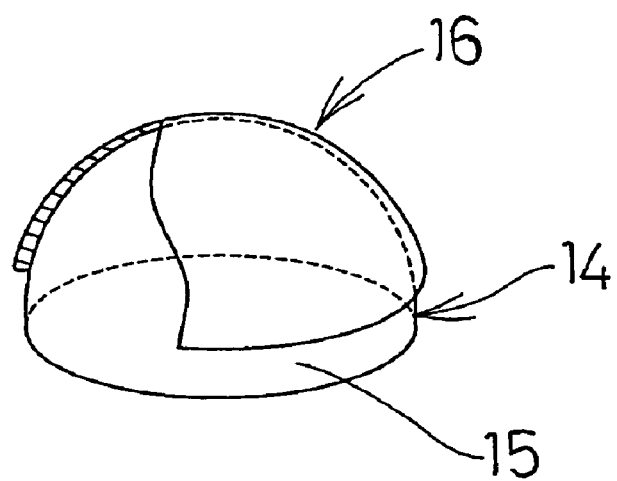
FIG. 4 is a partially cut-away perspective view showing a baked condition of the cup shaped baked confectionary.

During baking, the dough 16 of the cup shaped baking confectionary is soften associating with melting of internal solid fact to cause slacking in the outer periphery 17 by its own weight to contact with the outer peripheral surface 15 of the three-dimensional baking die 14 (FIG. 3). On the other hand, by baking, evaporation of moisture content and expansion are caused to bake the cup shaped baked confectionary having the inner wall surface 18 extending along the outer peripheral surface 15 (FIG. 4).

The baked cup-shaped baked confectionary can be easily released from the three-dimensional baking die by turning the three-dimensional die up side down or upwardly picking up.

Figure 5:
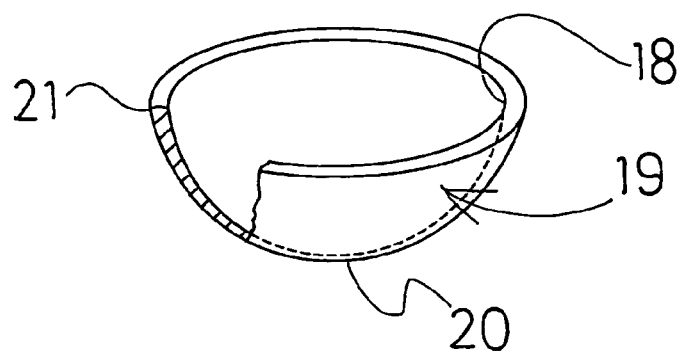
FIG. 5 is a partially cut-away perspective view showing the cup shaped baked confectionary in a condition released from the three-dimensional die.

Thus, the cup shaped baked confectionary 19 raising the peripheral wall around the center portion 20 (FIG. 5)

As set forth above, since the cup shaped baked confectionary 16 is shaped into the shape of the three-dimensional baking die 14 by its own weight during baking, it becomes unnecessary to forcedly pressing onto the three-dimensional baking die for preliminary shaping. Furthermore, since the dough is baked without pressing onto the outer peripheral surface of the three-dimensional baking die, the baked cup shaped baked confectionary 19 is easy to release from the die. Accordingly, even when the dough 16 punched from thin rolled sheet or the dough formed by punching into small pieces and then shaped, is used, the baked confectionary 19 based as set forth above can be released from the three-dimensional baking die 14 without cracking of the cup shaped baked confectionary 19. By this, it becomes possible to manufacture even thin and small cup shaped baked confectionary.

Furthermore, by adjusting thickness of the sheet dough, the thickness of the dough of the cup shaped baked confectionary can be easily controlled.

On the other hand, different from the case of baking by sandwiching two baking plates, expansion of the dough 16 of the cup shaped baked confectionary is not interfered to obtain the cup shaped baked confectionary with lesser damage to the dough of the cup shaped baked confectionary and light texture. On the other hand, in comparison with the conventional manufacturing method, the cup shaped baked confectionary having uniform thickness can be obtained.

It should be appreciated that various baked confectionary can be produced by filling gustatory agent adjusted with viscosity, such as cream, chocolate, mayonnaise, jam and so forth or solid substance, such as almond and so forth.

Embodiment 1

Raw materials consisted of 100 Wt parts of soft flour, 30 Wt parts of sugar, 45 Wt parts of margarine, 5 Wt parts of skim milk, 5 Wt parts of whole egg, 20 Wt parts of liquid sugar, 0.6 Wt parts of salt, 1 Wt parts of baking soda, 1 Wt parts of ammonium carbonate, 0.5 Wt parts of vanilla flavoring agent are blended and stirred, and foaming adjustment is performed until a specific gravity becomes about 0.9 to obtain a dough mass containing 7.4 Wt % of protein, 24.5 Wt % of fat, and 65.0 Wt % of sugar in solid component. Then, the dough mass is rolled to form a sheet dough having 2 mm of thickness.

Next, by punching the sheet dough, a circular dough of the cup shaped baked confectionary having diameter of 4 cm is formed. The dough is placed on the top of the three dimensional baking die 14 having hemi-sphere outer peripheral surface 15 and 3 cm of bottom diameter aligning centers thereof. At this time, the center of the dough 16 of the cup shaped baked confectionary contacts with the top of the three dimensional baking die 14. While the outer periphery 17 of the dough 16 slightly slacks downwardly, it does not contact with the outer peripheral surface 15 and held in a condition extending outward of the three dimensional baking die. In this condition, the dough 16 of the cup shaped baking confectionary is baked for 7 minutes at 180 Ž.

Temperature of the dough 16 of the cup shaped baked confectionary which was 20 Ž before baking, becomes about 55 Ž after one minutes from initiation of heating. Then, the entire lower surface of the dough 16 of the cup shaped baked confectionary comes to contact with the three-dimensional baking die 14.

After backing for seven minutes, thickness of the center portion of the obtained cup shaped baked confectionary 19 is about 3 mm, and thickness of the edge portion 21 of the peripheral wall is about 3.4 mm. Therefore, the cup shaped baked confectionary 19 has substantially uniform thickness over the entire portion. On the other hand, the cup shaped baked confectionary 19 contains 7.5 Wt % of protein, 24.9 Wt % of fat and 66.2 Wt % of sugar in solid component and provides crispy, light texture and good taste similarly to the case where the dough 16 of the cup shaped baked confectionary on a flat baking plate.

Comparative Example 1

At first, raw materials consisted of 60 Wt parts of hard flour, 40 Wt parts of soft flour, 5 Wt parts of margarine, 1 Wt parts of salt, 0.5 Wt parts of vanilla flavor agent and 50 Wt parts of water were blended and stirred, and aging was affected at low temperature. Subsequently, 47 Wt parts of roll-in margarine was wrapped to obtain a dough mass containing 7.8 Wt % of protein, 35.7 Wt % of fat and 55.2 Wt % of sugar in solid component. Then, by using a folding machine and sheeter, sheet dough of multi-layer structure in 3 mm thick was formed.

The sheet dough is punched into circular dough for cup shaped baked confectionary having a diameter of 4 cm, put on the three dimensional baking die 14 used in the embodiment 1 and baked for 20 minutes at 200 Ž.

The dough 16 of the cup shaped baked confectionary has large expansion during baking and can slack off the three-dimensional baking die 14, or cavity surrounded by the peripheral wall can be substantially filled to cause difficulty in baking the cup shaped confectionary. It should be noted that the confectionary thus baked contained 7.8 Wt % of protein, 35.7 Wt % of fat, 55.2 Wt % of sugar in solid component.

Comparative Example 2

Raw materials consisted of 100 Wt parts of medium flour, 10 Wt parts of butter, 8 Wt parts of shortening, 30 Wt parts of sugar, 2 Wt parts of skim milk, 5 Wt parts of whole egg, 1 Wt part of salt, 0.1 Wt parts of baking powder, 0.2 Wt parts of ammonium carbonate, 0.5 Wt parts of vanilla flavor agent and 15 Wt parts of water were blended and stirred according to common procedure to obtain dough mass containing 6.8 Wt % of protein, 13.4 Wt % of fat, 77.8 Wt % of sugar in solid component.

The dough mass is formed into sheet form, and punched into circular shape with 4 cm diameter. The punched dough sheet is mounted on the three-dimensional baking plate 14 and baked for twelve minutes at 120 Ž.

The dough of the cup shaped baked confectionary was less flexible for small amount of fat to cause cracking during baking and was broken upon removing from the three-dimensional baking plate 14. It should be noted that the baked cup shaped baked confectionary contains 6.8 Wt % of protein, 13.4 Wt % of fat and 77.9 Wt % of sugar.

Comparative Example 3

Raw materials consisted of 60 Wt parts of hard flour, 40 Wt parts of soft flour, 5 Wt parts of margarine, 1 Wt parts of salt, 0.5 Wt parts of vanilla flavor agent and 50 Wt parts of water were blended and stirred, and aging was affected at low temperature. Subsequently, 36 Wt parts of roll-in margarine was wrapped to obtain a dough mass containing 8.4 Wt % of protein, 30.7 Wt % of fat and 59.5 Wt % of sugar in solid component. Then, by using a folding machine and sheeter, sheet dough of multi-layer structure in 3 mm thick was formed.

The sheet dough is punched into circular dough for cup shaped baked confectionary having a diameter of 4 cm, put on the three dimensional baking die 14 used in the embodiment 1 and baked for 20 minutes at 200 Ž.

The dough 16 of the cup shaped baked confectionary has large expansion during baking and can slack off the three-dimensional baking die 14, or cavity surrounded by the peripheral wall can be substantially filled to cause difficulty in baking the cup shaped confectionary. It should be noted that the confectionary thus baked contained 8.4 Wt % of protein, 30.7 Wt % of fat, 59.5 Wt % of sugar in solid component.

Comparative Example 4

Raw materials consisted of 100 Wt parts of medium flour, 10 Wt parts of butter, 9 Wt parts of shortening, 45 Wt parts of sugar, 2 Wt parts of skim milk, 5 Wt parts of whole egg, 1 Wt part of salt, 0.1 Wt parts of baking powder, 0.2 Wt parts of ammonium carbonate, 0.5 Wt parts of vanilla flavor agent and 15 Wt parts of water were blended and stirred according to common procedure to obtain dough mass containing 6.1 Wt % of protein, 12.6 Wt % of fat, 79.4 Wt % of sugar in solid component.

The dough mass is formed into sheet form, and punched into circular shape with 4 cm diameter. The punched dough sheet is mounted on the three-dimensional baking plate 14 and baked for twelve minutes at 150 Ž.

The dough of the cup shaped baked confectionary was less flexible for small amount of fat to cause cracking during baking and was broken upon removing from the three-dimensional baking plate 14. It should be noted that the baked cup shaped baked confectionary contains 6.1 Wt % of protein, 12.7 Wt % of fat and 79.6 Wt % of sugar in solid component.

Embodiment 2

Figure 6:
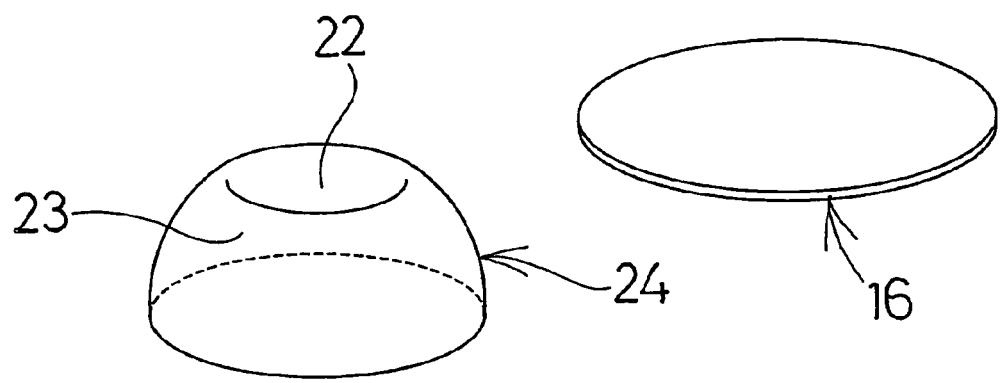
FIG. 6 is a perspective view of a three-dimensional baking die having hemi-spherical outer peripheral surface with a flat portion and a dough of a cup shaped baked confectionary.

In this embodiment, in place of the hemi-sphere three-dimensional baking die 14 used in the foregoing embodiment 1 and comparative examples 1 to 4, a three-dimensional baking die 24 having substantially hemi-sphere outer periphery as a whole with a flat portion 22 at the top thereof, and having 3 cm of diameter in a bottom surface (FIG. 6) was used.

Figure 7:
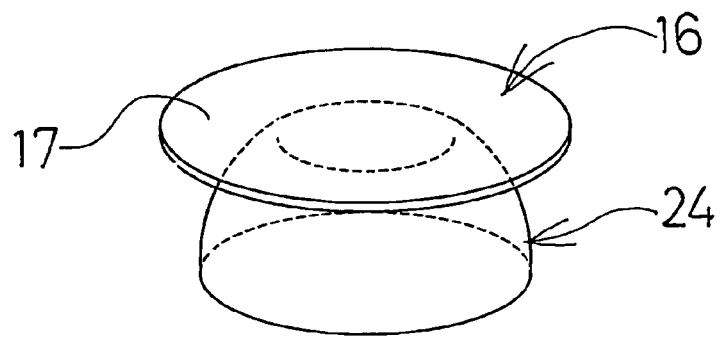
FIG. 7 is a perspective view showing a condition where the dough of the cup shaped baked confectionary is mounted on the three-dimensional baking die.

At first, raw materials consisted of 100 Wt parts of hard flour, 30 Wt parts of wheat starch, 40 Wt parts of shortening, 40 Wt parts of sugar, 5 Wt parts of liquid sugar, 5 Wt parts of condensed milk, 1.3 Wt parts of salt, 1 Wt part of baking powder, 1 Wt part of ammonium carbonate, 0.5 Wt parts of vanilla flavor agent and 60 Wt parts of water were blended and stirred to prepare a dough mass containing 6.0 Wt % of protein, 20.8 Wt % of fat and 70.5 Wt % of sugar in solid component. By punching the sheet dough formed by rolling the dough mass into a sheet having thickness of about 2 mm, the circular dough 16 for the cup shaped baked confectionary having diameter of 4 cm is formed. Then, the dough 16 of the cup shaped baked confectionary was placed on the top portion of the three-dimensional baking die 24 with aligning the center thereof with the center of the flat portion 22 (FIG. 7).

At this time, the cup shaped baked confectionary 16 is mounted in a condition where the dough is contacted to only flat portion 22 of the three-dimensional baking die 24. The outer periphery 17 slacks little and extends outwardly of the three-dimensional baking die 14 horizontally.

Figure 8:
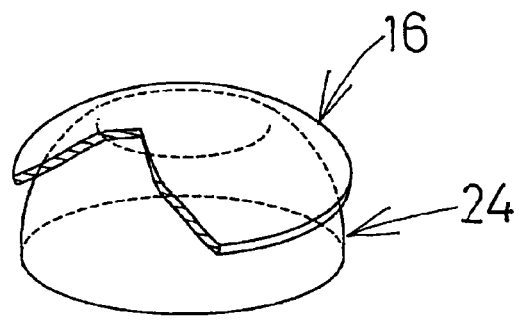
FIG. 8 is a perspective view showing a condition where the outer periphery of the dough of the cup shaped baked confectionary slacks during baking.
Figure 9:
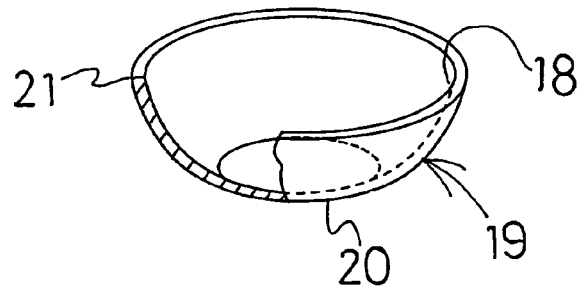
FIG. 9 is a partially cut-away perspective view showing the cup shaped baked confectionary in a condition released from the three-dimensional die.
Figure 10A:
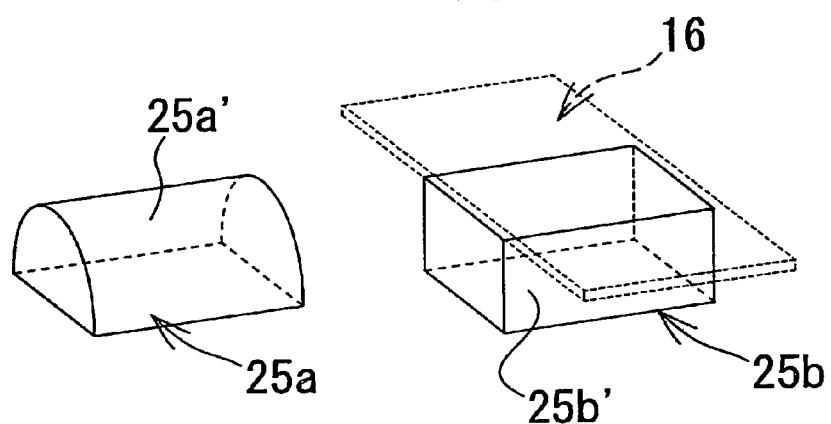
FIGS. 10(a) to 10(d) are perspective views showing three-dimensional dies of other shapes.
Figure 10B:
Figure 10C:
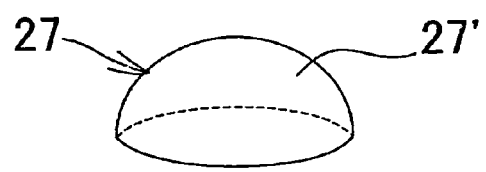
Figure 10D:
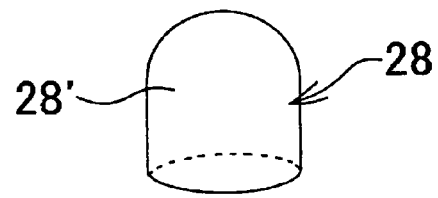

Next, the dough 16 of the cup shaped baked confectionary is put into the oven together with the three-dimensional baking die 24 for baking for 7 minutes at 180 Ž. Temperature of the dough 16 of the cup shaped baked confectionary which was 20 Ž before initiation of baking, is elevated to about 55 Ž at one minutes from initiation of baking. The dough 16 of the cup shaped baked confectionary is then softened associating with melting of internal solid fats to cause slacking of the outer periphery 17 by its own weight (FIG. 8). Subsequently, temperature of the dough 16 is elevated at about 75 Ž after two minutes, about 80 Ž after three minutes, about 87 Ž after four minutes and about 94 Ž after five minutes. Then, evaporation of the moisture component and expansion are caused during baking. After seven minutes, the cup shaped baked confectionary is baked with the inner wall surface 18 extending along the shape of the outer peripheral surface 23 of the three-dimensional baking die 24.

The thickness of the center portion 20 and the thickness of the edge portion 21 of the peripheral wall were both about 3 mm. Thus, the cup shaped baked confectionary 19 has uniform thickness over entirely. On the other hand, the cup shaped baked confectionary 18 contains 6.0 Wt % of protein, 21.1 Wt % of fat and 71.6 Wt % of sugar in solid component and provides crispy, light texture and good taste similarly to the case where the dough 16 of the cup shaped baked confectionary on a flat baking plate.

Embodiment 3

Raw materials consisted of 100 Wt parts of medium flour, 10 Wt parts of butter, 20 Wt parts of shortening, 30 Wt parts of sugar, 2 Wt parts of skim milk, 5 Wt parts of whole egg, 1 Wt part of salt, 0.1 Wt parts of baking powder, 0.2 Wt parts of ammonium carbonate, 0.5 Wt parts of vanilla flavor agent and 15 Wt parts of water were blended and stirred to obtain the dough mass containing 6.3 Wt % of protein, 20.3 Wt % of fat and 71.5 Wt % of sugar in sold component was obtained. The dough mass is rolled to obtain a sheet dough in a thickness of 3 mm. Then, the 4 cm diameter circular dough of the cup shaped baked confectionary obtained by punching of the sheet dough was mounted on the hemi-sphere three-dimensional baking die having the bottom surface of 3 cm diameter similar to that employed in the embodiment 1 and baked for 12 minutes at 180 Ž.

The baked cup shaped baked confectionary 19 had uniform thickness of about 5 mm entirely, contained 6.3 Wt % of protein, 20.4 W % of fat and 71.7 Wt % of sugar and provides crispy, light texture and good taste similarly to the case where the dough 16 of the cup shaped baked confectionary on a flat baking plate.

In respective of foregoing embodiments and comparative examples, contents of protein, fat and sugar are values relative to the weight of the solid component removing moisture content. It should be appreciated that in the cup shaped baked confectionary of the type in question, the moisture content is in an extent of 15 to 32 Wt % relative to the weight of the dough before baking, and about 0.5 to 2.0 Wt % after baking, typically.

In the foregoing case, while the three-dimensional baking dies 14 and 24 are provided hemi-sphere or generally hemi-sphere outer peripheral surfaces, the shape of the three-dimensional baking die may be selected arbitrary, such as a three-dimensional baking die 25a having semi-cylindrical outer peripheral surface 25a', a three-dimensional baking die 25b having a quadrangular parallelepiped outer peripheral surface 25b', a three-dimensional baking die 26 having a semi-elliptical ball shaped outer peripheral surface 26', a three-dimensional baking die 27 having a generally semi-elliptical ball shaped outer peripheral surface 27', a three-dimensional baking die 28 having campanulate shaped outer peripheral surface 28', for obtaining desired shape of the cup shaped baked confectionary, as shown in FIGS. 10(*a*) to 10(*d*).

Figure 11A:
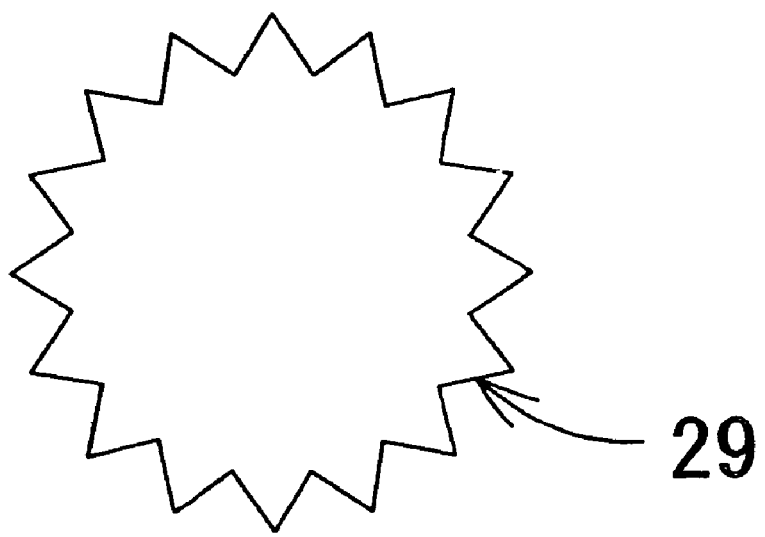
FIGS. 11(a) and 11(b) are plan view showing the dough of the cup shaped baked confectionary formed with indentation and perspective views of the cup shaped baked confectionary obtained by baking.
Figure 11B:
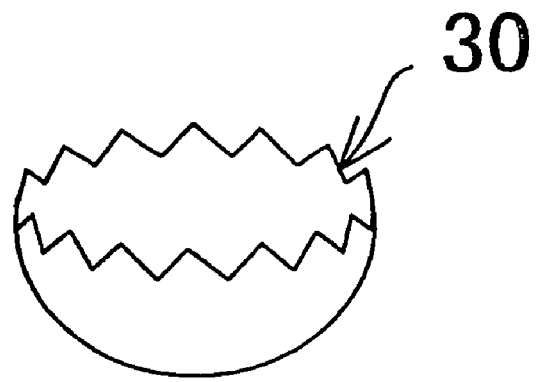
Figure 12A:
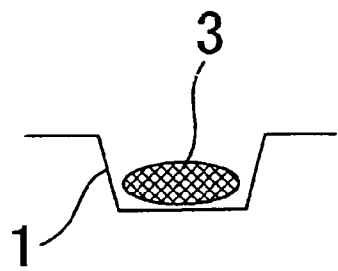
Figure 12B:
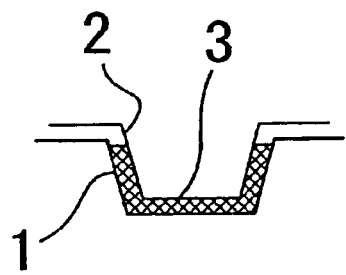
Figure 12C:
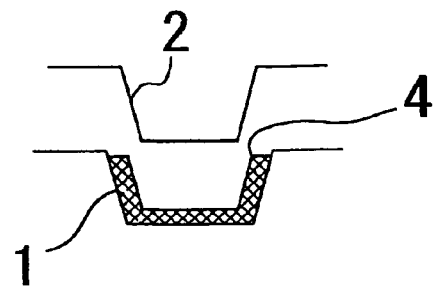
Figure 13A:
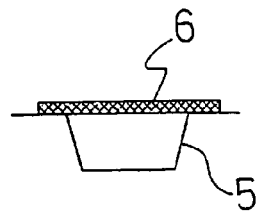
Figure 13B:
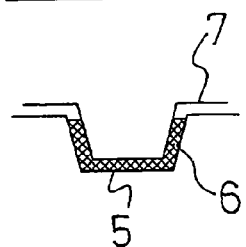
Figure 13C:
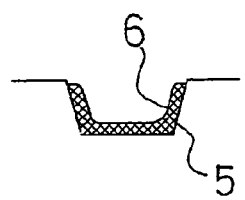
Figure 13D:
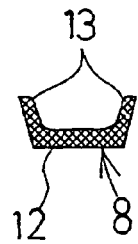
Figure 14:
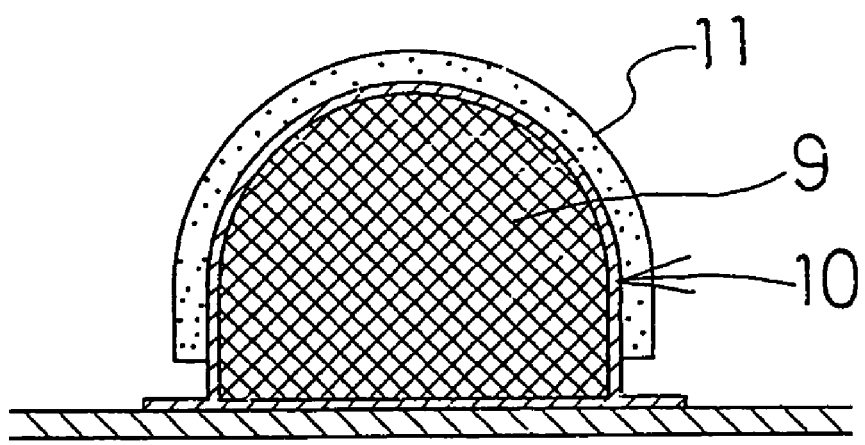
FIG. 14 is a section showing a further conventional production process of the cup shaped baked confectionary.

On the other hand, while the foregoing cup shaped baked confectionary 16 is formed into circular shape, it is possible to obtain the cup shaped baked confectionary of any desired contour configuration to obtain various shapes of cup shaped baked confectionary. For example, as shown in FIG. 10(*a*), the dough may be square shape. On the other hand, as shown in FIG. 11(*a*), by baking the dough of the cup shaped baked confectionary formed with indentation on the outer peripheral edge, the cup shaped baked confectionary 30 with indented outer peripheral edge.

As can be clear from the discussion given above, with the manufacturing method the cup shaped baked confectionary according to the present invention, the following effects can be achieved.

By mounting the dough of the cup shaped baked confectionary having desired contour shape on the top of the metallic three-dimensional baking die in a condition extending horizontally with placing the outer periphery thereof outside of the three-dimensional baking die, and heating the dough, the dough of the cup shaped baked confectionary is softened to contact with the outer peripheral surface of the three-dimensional baking die and baked. Therefore, it becomes unnecessary to preliminarily shape the dough.

On the other hand, since the dough is baked without press fitting the dough onto the three-dimensional baking die, the baked cup shaped baked confectionary can be easily released. Accordingly, even when the dough formed by punching from the sheet dough rolled with small thickness or small punched dough of the cup shaped baked confectionary are used, the baked cup shaped baked confectionary can be removed from the three-dimensional baking die without causing breakage.

By this, it becomes possible to easily manufacture even thin and small cup shaped baked confectionary. Furthermore, by adjusting thickness of the sheet dough, the thickness of the dough of the cup shaped baked confectionary can be easily controlled.

On the other hand, different from the case of baking with sandwiching the dough by two baking plates, expansion of the dough of the cup shaped baked confectionary may not be interfered. Therefore, the dough of the cup shaped baked confectionary may be damaged little to obtain the cup shaped baked confectionary of light texture. Also, in comparison with the conventional manufacturing method, it becomes possible to obtain the cup shaped baked confectionary with uniform thickness.

It should be noted that since working process is simple, the cup shaped baked confectionary can be easily produced to enable manufacturing of the cup shaped baked confectionary by mechanization and automation.

The cup shaped baked confectionary according to the present invention can be produced by the foregoing method, it can be easily released from the die, have light texture, and has more uniform thickness in comparison with the prior art.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A production method of a cup shaped baked confectionary comprising the steps of:
    mounting a sheet dough of a cup shaped baked confectionary having a desired contour shape and a thickness in a range of 1 to 6 mm on a top of a metallic three-dimensional baking die having a desired shape of outer peripheral non-mesh surface, in a condition extending horizontally with placing the outer periphery of the sheet dough outside of said three-dimensional baking die; and
    heating said dough, without sandwiching the dough between two baking plates, for softening said dough of the cup shaped baked confectionary to contact on the outer peripheral surface of the three-dimensional baking die for baking,
    wherein the sheet dough is prepared by rolling a dough mass containing 5 to 15 Wt % of protein, 15 to 28 Wt % of fat and 60 to 78 Wt % of carbohydrate.

2. A production method of a cup shaped baked confectionary as set forth in claim 1, wherein the outer peripheral surface of said three-dimensional baking die is shaped as one of a hemi-sphere shape, semi-elliptic ball shape, campanulate shape, semi-elliptic ball shape having leaf shaped bottom surface, semi-cylindrical shape or rectangular parallelepiped shape.

3. A production method of a cup shaped baked confectionary as set forth in claim 1, wherein the outer peripheral surface of said three-dimensional baking die includes a flat portion at the top thereof and is formed into one of a generally hemi-sphere shape, generally semi-elliptic ball shape, generally campanulate shape, generally semi-elliptic ball shape having leaf shaped bottom surface or generally semi-cylindrical shape.

4. A production method of a cup shaped baked confectionary as set forth in claim 1, wherein the sheet dough is prepared by rolling a dough mass containing 5 to 10 Wt % of protein, 18 to 26 Wt % of fat and 63 to 75 Wt % of carbohydrate in solid component and is formed into a desired shape by punching.

* * * * *